(No Model.)
J. F. KRIES.
DISH LIFTER.
No. 575,962. Patented Jan. 26, 1897.
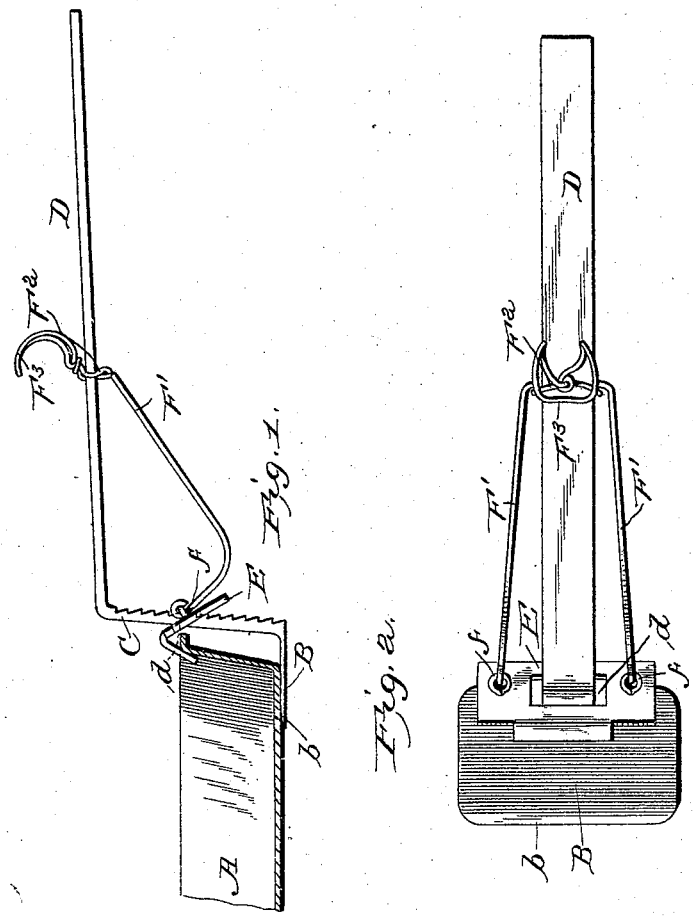
Attest
Walter Donaldson
F. L. Middleton
Inventor
John Frank Kries
by Ellis Spear
Atty

UNITED STATES PATENT OFFICE.

JOHN FRANK KRIES, OF CHARLESTON, WEST VIRGINIA.

DISH-LIFTER.

SPECIFICATION forming part of Letters Patent No. 575,962, dated January 26, 1897.

Application filed September 1, 1896. Serial No. 604,525. (No model.)

*To all whom it may concern:*

Be it known that I, JOHN FRANK KRIES, a citizen of the United States, residing at Charleston, in the county of Kanawha and State of West Virginia, have invented certain new and useful Improvements in Dish-Lifters, of which the following is a specification, reference being had therein to the accompanying drawings.

My invention relates to improvements in devices for lifting and carrying hot dishes of various kinds; and the object of the invention is to provide a device by which dishes of various shapes and sizes may be quickly lifted and carried from one place to another without any danger of dropping them.

A further object is to provide a device which is adapted for carrying glass dishes without any danger of breaking them or chipping the edges.

The invention is illustrated in the accompanying drawings, in which—

Figure 1 is a side elevation illustrating the device in position to lift a dish. Fig. 2 is a plan view.

In the drawings I have shown a dish to be lifted at A, this being representative of any form of dish which it may be desired to lift.

The lifter proper comprises a platform portion B, which is adapted to be shoved under the dish to be lifted, as shown in Fig. 1, and for this purpose is made comparatively thin and terminates in a beveled or tapered front edge $b$, whereby it is enabled to slide easily under the dish. From the rear of the platform portion rises a substantially vertical post C, which is serrated or notched on its rear edge or side for a purpose hereinafter to be described, the post rising as high as the top of the largest dish it may be desired to lift. A handle portion D extends rearwardly from the top of the post for a suitable length and is suitably shaped to be conveniently grasped by the hand.

It will of course be understood that the platform, post, and handle portion may be made in one or more pieces, as desired. In the drawings I have shown them as made from a single piece of metal of suitable thickness, the platform being formed by flattening out the metal.

In order to hold the edge of the dish upon the platform, I provide a sliding retaining-plate E, having a recess $d$ to receive the post and permit it to slide thereon, the forward edge of this plate carrying a lip or lug adapted to extend down over the upper edge of the pan, as shown in Fig. 1. After the finger has engaged the upper edge of the dish or pan it is automatically held against movement on the post by the rear edge of the opening binding against the toothed or serrated portion of the post.

The plate is adapted to be positively operated vertically to release it from the edge of the dish and to adjust it in position to grasp another by a carrier which consists of two arms F', connected centrally to eyes $f$ upon each side of the plate, the arms extending upwardly and rearwardly to a looped portion which embraces and slides upon the handle, as shown at $F^2$. This looped portion is provided above the handle with a suitable portion $F^3$, by which it may be drawn backward and forward along the handle, thus raising and lowering the retaining-plate.

The carrier F with the loop and the portion $F^3$ may be formed, as shown, of a single piece of wire twisted upon itself to form the portions $F^2$ and $F^3$.

Having thus described my invention, what I claim is—

1. A dish-lifter comprising the platform portion, the vertical portion having a horizontally-extending handle, and the retaining-plate movably carried upon the vertical portion, to slide thereon, and means sliding on the handle for operating said plate substantially as described.

2. A dish-lifter comprising the platform portion, the vertical portion having the horizontally-extending handle, the retaining-plate movably carried upon the vertical portion independent of the handle, and independent means for moving said retaining-plate from the handle, substantially as described.

3. A plate-lifter comprising a platform portion and a handle with the vertical portion between a retaining-plate having an opening in its body portion, said plate being held on the vertical portion by having said vertical portion pass through the opening in the retaining-plate and means connected with the retaining-plate and extending to the handle to operate said plate, substantially as described.

4. A plate-lifter comprising the horizontal platform portion, the vertical portion having a serrated part, the angular retaining-plate freely movable on the vertical portion adapted to directly engage the teeth and to be clamped in place solely by the weight of the dish, substantially as described.

5. In combination with the handle having the platform portion and the vertical portion, the angular retaining-plate movable vertically on said vertical portion, one arm of the retainer being on the front of the vertical portion and the other arm extending to the rear where it engages teeth on the rear side of said vertical portion.

6. A dish-lifter comprising the platform portion, the vertical portion, the horizontally-extending handle, the retaining-plate movable upon the vertical portion, and having a hooked edge, and the operating-carrier pivotally connected with the retaining-plate and having its rear end slidably connected with the handle substantially as described.

7. A dish-lifter comprising the platform portion, the vertical portion having a serrated rear face, the handle, the retaining-plate having an opening to travel upon said vertical portion and having a hooked edge to engage with the dish edge, the carrier pivotally connected by its forward end to the said plate, the rear end of said carrier being provided with a loop to receive and slide upon the handle, substantially as described.

In testimony whereof I affix my signature in presence of two witnesses.

JOHN FRANK KRIES.

Witnesses:
WM. O. JONES,
STEVE SHANAHAN.